United States Patent
Gil

(10) Patent No.: US 9,043,961 B2
(45) Date of Patent: Jun. 2, 2015

(54) ARTIFICIAL TURF CLEANING SYSTEM

(75) Inventor: Noam Gil, Kfar Gibton (IL)

(73) Assignee: GREEN TURTLE LTD., Herzliya Pituach (IL)

(*) Notice: Subject to any disclaimer, the term of this patent is extended or adjusted under 35 U.S.C. 154(b) by 0 days.

(21) Appl. No.: 13/360,819

(22) Filed: Jan. 30, 2012

(65) Prior Publication Data

US 2013/0192633 A1    Aug. 1, 2013

(51) Int. Cl.
*A01G 1/12* (2006.01)
*E01H 1/04* (2006.01)

(52) U.S. Cl.
CPC ............... *A01G 1/125* (2013.01); *E01H 1/045* (2013.01)

(58) Field of Classification Search
CPC ....... A47L 11/08; A47L 11/085; A47L 11/06; A47L 11/065; A47L 11/292; A47L 11/22; A47L 11/26
See application file for complete search history.

(56) References Cited

U.S. PATENT DOCUMENTS

| | | | | |
|---|---|---|---|---|
| 1,531,701 A * | 3/1925 | Jossart | ............................. | 15/50.3 |
| 1,644,189 A * | 10/1927 | Hendricks | ....................... | 15/50.3 |
| 3,644,954 A * | 2/1972 | LeGrand | ......................... | 15/50.3 |
| 3,848,290 A * | 11/1974 | Bates | ............................... | 15/321 |
| 4,173,054 A * | 11/1979 | Ando | ................................... | 15/98 |
| 2002/0092115 A1* | 7/2002 | Zahuranec et al. | ............. | 15/320 |
| 2006/0075596 A1* | 4/2006 | Bosses | ............................. | 15/320 |
| 2007/0174980 A1* | 8/2007 | Prevost | .......................... | 15/50.1 |

* cited by examiner

*Primary Examiner* — Nicole Blan

(57) ABSTRACT

An artificial turf cleaning system and a method for cleaning artificial turf surfaces are disclosed. The artificial turf cleaning system includes (a) at least two wheels, (b) at least one liquid tank, (c) a tap for controlling the dripping rate and covering at least one liquid tank, (d) a cleaning drum having replaceable brushes, and wherein the cleaning drum is coupled mechanically to the wheels by cog-wheels transmission gear, (e) a removable rubbish storage tank, and (f) a handle, wherein the artificial turf cleaning system is designed for manually cleaning artificial turf surfaces.

9 Claims, 11 Drawing Sheets

ARTIFICIAL TURF CLEANING SYSTEM

FIELD OF THE INVENTION

The invention relates generally to artificial turf cleaning systems and methods for cleaning artificial turf surfaces.

BACKGROUND OF THE INVENTION

Artificial turf is a surface manufactured from synthetic fibers made to look like natural grass. It is most often used in arenas for sports that were originally or are normally played on grass. However, it is now being used on residential lawns and commercial applications as well. The main reason is maintenance—artificial turf resists heavy use, such as in sports, and requires no irrigation or trimming.

FIG. 1. Illustrates typical artificial turf surface. Artificial turf is made of straight fibers 110 that may be coated with silicon; a layer of rubber granules 120 is laid on a base layer of polypropylene 130. Curly fibers 140 are used to keep the straight fibers 110 upright as shown in FIG. 1.

Artificial turf surfaces accumulate dirt and rubbish in between the fibers that are not washed away due to the polypropylene base layer by rain for example in contrast to natural grass.

Thus, it would be highly advantageous to provide cost effective cleaning systems for artificial turf surfaces. It would be highly advantageous to provide cleaning systems for artificial turf surfaces that would be simple to operate and maintain, cleaning systems that would be hazard free to the environment and to people, and designed for cleaning artificial turf surfaces in residential lawns.

SUMMARY OF THE INVENTION

An artificial turf cleaning system and a method for cleaning artificial turf surfaces are disclosed. The artificial turf cleaning system includes (a) at least two wheels, (b) at least one liquid tank, (c) a tap for controlling the dripping rate and covering at least one liquid tank, (d) a cleaning drum having replaceable brushes, and wherein the cleaning drum is coupled mechanically to the wheels by cog-wheels transmission gear, (e) a removable rubbish storage tank, and (f) a handle, wherein the artificial turf cleaning system is designed for manually cleaning artificial turf surfaces.

According to a further feature of an embodiment of the present invention, the artificial turf cleaning system is simple to operate, cost effective and designed for manually cleaning artificial turf surfaces of residential lawns.

According to a further feature of an embodiment of the present invention, the cog-wheels transmission gear connects the cleaning drum to the wheels when the artificial turf cleaning system is pushed forward, and wherein the cog-wheels transmission gear disconnects the cleaning drum from the wheels when the artificial turf cleaning system is pushed backwards.

According to a further feature of an embodiment of the present invention, rotation of the wheels when pushed forward on artificial turf, back-rotates the cleaning drum, the cleaning drum coupled mechanically by the transmission gear cog-wheels to the artificial turf cleaning system wheels, and wherein the replaceable cleaning brushes installed in the cleaning drum comb out dirt and rubbish accumulated in between the artificial turf fibers into the removable rubbish storage tank.

According to a further feature of an embodiment of the present invention, the replaceable cleaning brushes are provided with brush fibers that are of different length, width, stiffness and density.

According to a further feature of an embodiment of the present invention, the artificial turf cleaning liquid is extracted only from natural fats and plants and does not include chemicals extracted from oils, salts, heavy metals and inorganic acids, and wherein the cleaning liquid does not pollute the environment and is hazard-free for people, children and animals walking, crawling, playing or lying down on the artificial turf.

According to a further feature of an embodiment of the present invention, the artificial turf cleaning liquid is volatile and does not leave traces on the artificial turf.

According to a further feature of an embodiment of the present invention, the cleaning liquid does not dissolve the glue or weaken the glue that glues the artificial turf to the underneath surface.

According to a further feature of an embodiment of the present invention, the artificial turf cleaning system includes further a water tank and a mixing tank, wherein the cleaning liquid is stored in at least one liquid tank and water is stored in the water tank, and wherein the cleaning liquid and water are mixed with a 1 to 4 ratio in the mixing tank.

According to a further feature of an embodiment of the present invention, the artificial turf cleaning system includes further an elongated rod and an internal tap, wherein the tap used for controlling the dripping rate and for covering the water tank has two protrusions in its bottom that protrude into two matching sockets in a proximal end of the elongated rod, and wherein the distal end of the elongated rod is connected to the internal tap such that when the tap used for covering the water tank is rotated it rotates the internal tap that controls the dripping rate of the mixed cleaning liquid.

According to a further feature of an embodiment of the present invention, the artificial turf cleaning system tap has at least three dripping rate states in addition to a closed state.

According to a further feature of an embodiment of the present invention, the artificial turf system cleaning liquid drips through an array of nozzles.

According to a further feature of an embodiment of the present invention, the artificial turf system cleaning drum is further configured to vibrate in the direction of its axis, in the perpendicular direction to the direction of movement of the artificial turf cleaning system, in order to effectively brush rubbish hidden in-between the artificial turf fibers.

According to a further feature of an embodiment of the present invention, the cleaning drum vibration is achieved by providing a diagonal profile shape of one side of the cleaning drum such that when it is rolling around its axis it is pushed along its axis by a protrusion mounted on the inside wall of the artificial turf cleaning system, and wherein a spring located on another side of the cleaning drum is tensed when the cleaning drum is pushed onto the spring and wherein the spring then pushes back the cleaning drum when the wheels are rolling, creating the cleaning drum vibration.

According to a further feature of an embodiment of the present invention, the artificial turf cleaning system includes further a light source and an energy supply.

According to a further feature of an embodiment of the present invention, the artificial turf cleaning system energy supply is a mechanical dynamo used to transfer rotational energy of the wheels into light.

According to a further feature of an embodiment of the present invention, the energy supply is a battery.

According to a further feature of an embodiment of the present invention, the artificial turf cleaning system does not require specialized mechanical tools or know-how for operating and maintaining the system, and wherein the system is cost effective.

According to a further feature of an embodiment of the present invention, the artificial turf cleaning system further includes a power supply for rolling the wheels on the artificial turf forward and backwards and for rotating the cleaning drum.

According to a further feature of an embodiment of the present invention, a method for cleaning artificial turf surfaces is disclosed, the method includes the steps of: (a) providing an artificial turf cleaning system comprised of (i) at least two wheels; (ii) at least one cleaning liquid tank and one water tank; (iii) a tap for controlling the cleaning liquid dripping rate and covering the water tank; (iv) a cleaning drum having replaceable brushes connected to the wheels by a transmission gear cog-wheels; (v) a removable rubbish storage tank; and (vi) a handle; (b) filling a cleaning liquid to the cleaning liquid tank; (c) filling water to the water tank; (d) opening the tap to allow the cleaning liquid to mix with the water and to drip on the cleaning drum brushes during cleaning the artificial turf; (e) manually pushing the cleaning artificial turf system on the artificial turf surfaces; and (f) manually emptying the rubbish from the removable rubbish storage tank.

According to a further feature of an embodiment of the present invention, the method further includes the step of replacing the brushes according to the artificial turf fiber size.

According to a further feature of an embodiment of the present invention, the method further includes replacing the brushes in accordance with a wear condition of the synthetic brushes by dismantling the cleaning drum from the artificial turf cleaning system replacing the brushes and re-assembling the artificial turf cleaning system.

According to a further feature of an embodiment of the present invention, the method further comprises the steps of creating a vibration of the cleaning drum along its rolling axis in the perpendicular direction to the direction of movement of the artificial turf cleaning system, wherein the cleaning drum vibration is used to effectively brush dirt and rubbish accumulated in-between the artificial turf fibers.

Additional features and advantages of the invention will become apparent from the following drawings and description.

BRIEF DESCRIPTION OF THE DRAWINGS

Various embodiments are herein described, by way of example only, with reference to the accompanying drawings, wherein.

DESCRIPTION OF THE PREFERRED EMBODIMENTS

The principles and operation of the artificial turf cleaning system and methods for cleaning artificial turf surfaces according to embodiments of the present invention may be better understood with reference to the drawings and the accompanying description.

Figure 2:
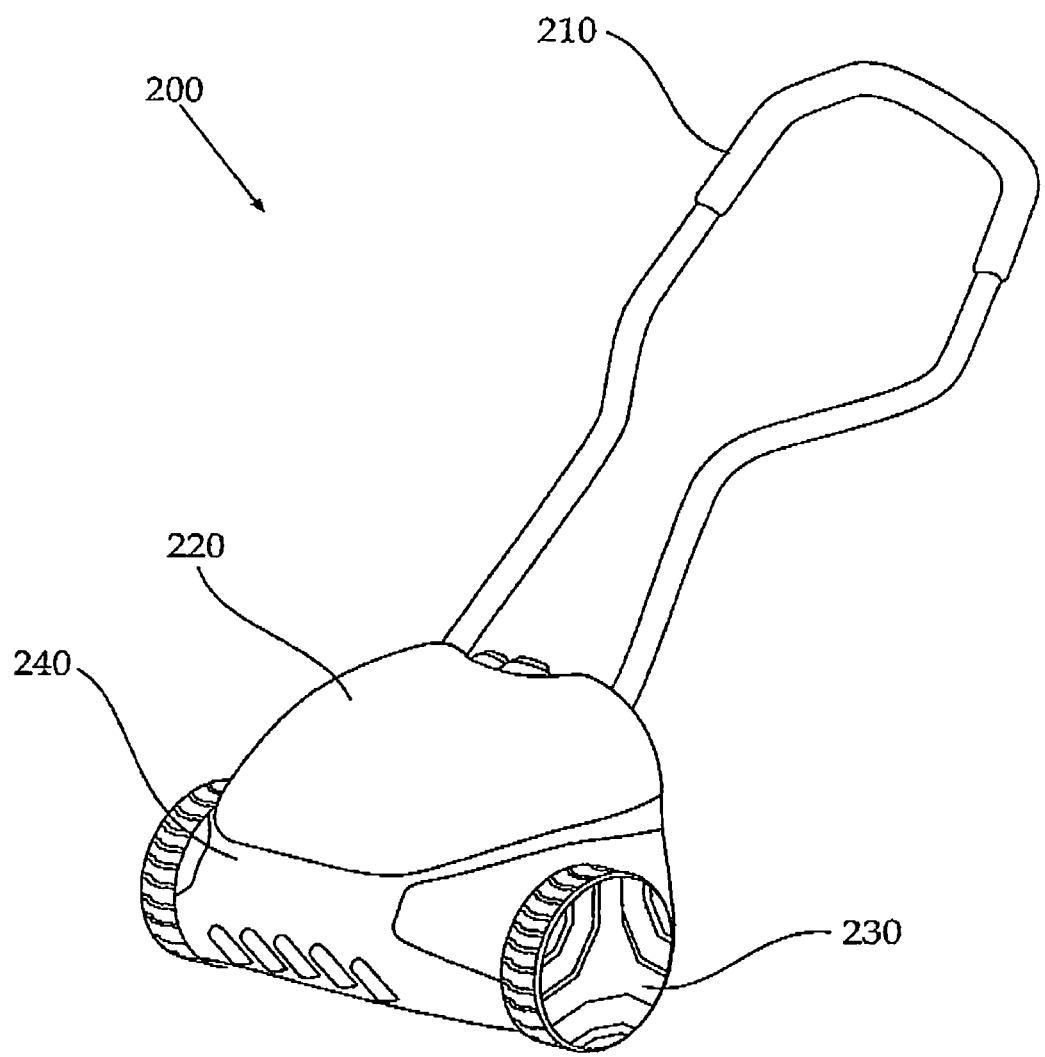
FIG. 2 illustrates the artificial turf cleaning system in isometric view, according to embodiments of the present invention.

FIG. 2 illustrates the artificial turf cleaning system in isometric view, according to embodiments of the present invention. Artificial turf cleaning system 200 includes a handle 210 body top cover 220 at least two wheels 230 a removable rubbish storage tank 240 at least one water tank and one artificial turf cleaning liquid tank (shown in FIG. 4), a rotating cleaning drum having replaceable brushes and connected to the wheels by a transmission gear (shown in FIG. 5, 520). The artificial turf cleaning system is pushed manually by an operator using handle 210 wherein rotation of wheels 230 when driven on the artificial turf forward, back-rotates the cleaning drum connected mechanically by a transmission gear cog-wheels to wheels 230. Replaceable cleaning brushes installed inside the cleaning drum comb out dirt and rubbish accumulated in the artificial turf surfaces into removable rubbish storage tank 240. A hazard free cleaning liquid drips onto the artificial turf cleaning drum brushes at a selectable rate determined by rotating the water tank tap shown in FIG. 4, 410. The artificial turf cleaning system 200 is a cost effective system, it is simple to operate and maintain, it is hazard free to the environment and to people and designed for manually cleaning artificial turf surfaces of residential lawns.

Figure 3:
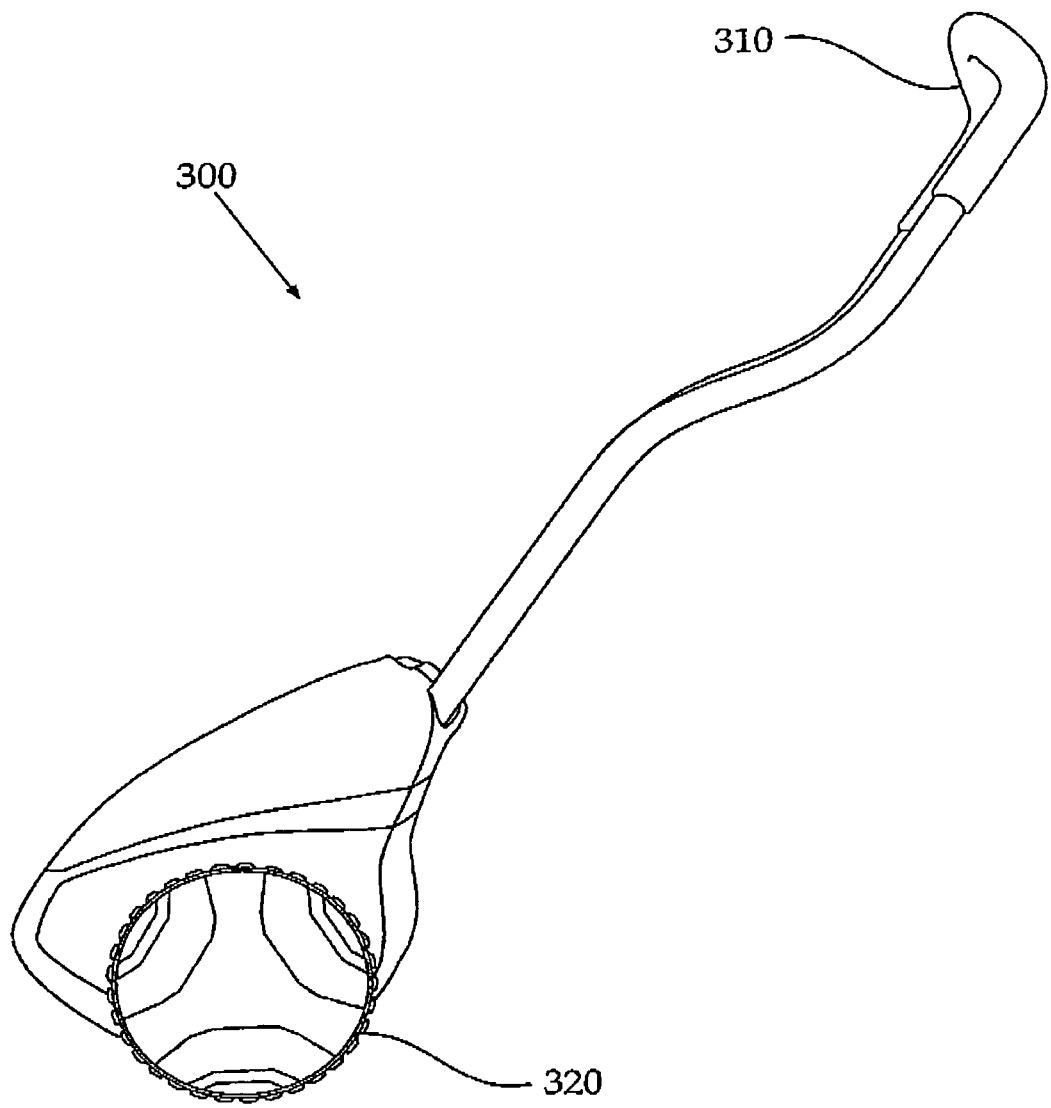
FIG. 3 illustrates the artificial turf cleaning system in side view, according to embodiments of the present invention.

FIG. 3 illustrates the artificial turf cleaning system in side view, according to embodiments of the present invention. Artificial turf cleaning system 300 handle 310 and wheels 320 are showed in the side view. Artificial turf cleaning system 300 does not use any power source and is mechanically operated as described further herein below. According to embodiments of the present invention a power source may be added to artificial turf cleaning system 300 in various locations in order to perform various functions. Such artificial turf cleaning systems are in the scope of the present invention.

Figure 4:
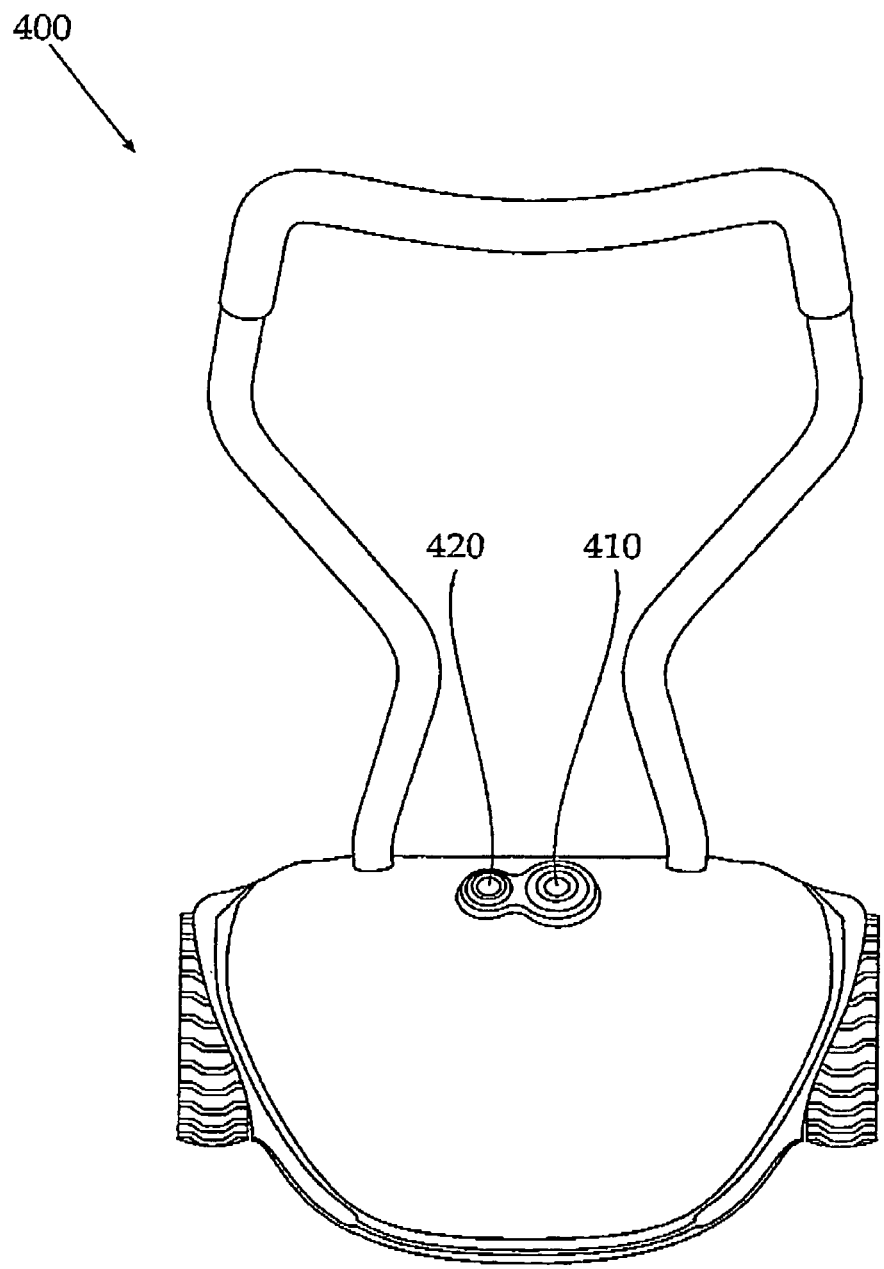
FIG. 4 illustrates the artificial turf cleaning system in top view, according to embodiments of the present invention.

FIG. 4 illustrates the artificial turf cleaning system in a top view, according to embodiments of the present invention. Artificial turf cleaning system 400 water tank tap 410 is used to determine the liquid dripping rate and is used to cover the artificial turf water tank (shown in FIG. 7, 710). A second tank. cover 420 is used to cover the artificial turf cleaning liquid tank (shown in FIG. 7, 730). Water tank tap 410 and cleaning liquid tank cover 420 may be removed from the tanks opening allowing convenient filling of the tanks with liquids. The artificial turf cleaning liquid is an environmentally friendly cleaning solution that does not pollute the environment.

According to embodiments of the present invention, the cleaning liquid is extracted from natural fats and plants only and does not include chemicals extracted from oils, salts, heavy metals and inorganic acids. The cleaning liquid is volatile and does not leave traces on the artificial turf surfaces and is hazard free for the environment and for people, children and animals walking, crawling, playing or lying down on the artificial turf. The artificial turf cleaning liquid manufacturing process does not require the use of any hazardous materials and its manufacturing is also pollutant free and friendly to the environment.

The artificial turf cleaning liquid, stored in the cleaning liquid tank (FIG. 7, 730), is mixed with water stored in the water tank (FIG. 7, 710) with a 1 to 4 ratio inside a mixing tank (shown in FIG. 8, 840) before the mixed cleaning solution drips onto the artificial turf cleaning drum. The artificial turf cleaning liquid does not include any inorganic acids or other hazardous chemicals that may harm the artificial turf glue, used for gluing the artificial turf to the underneath plastic surface. The artificial turf cleaning liquid ingredients are selected such that they do not harm or deteriorate the characteristics of the present invention artificial turf cleaning system internal parts.

Figure 5:
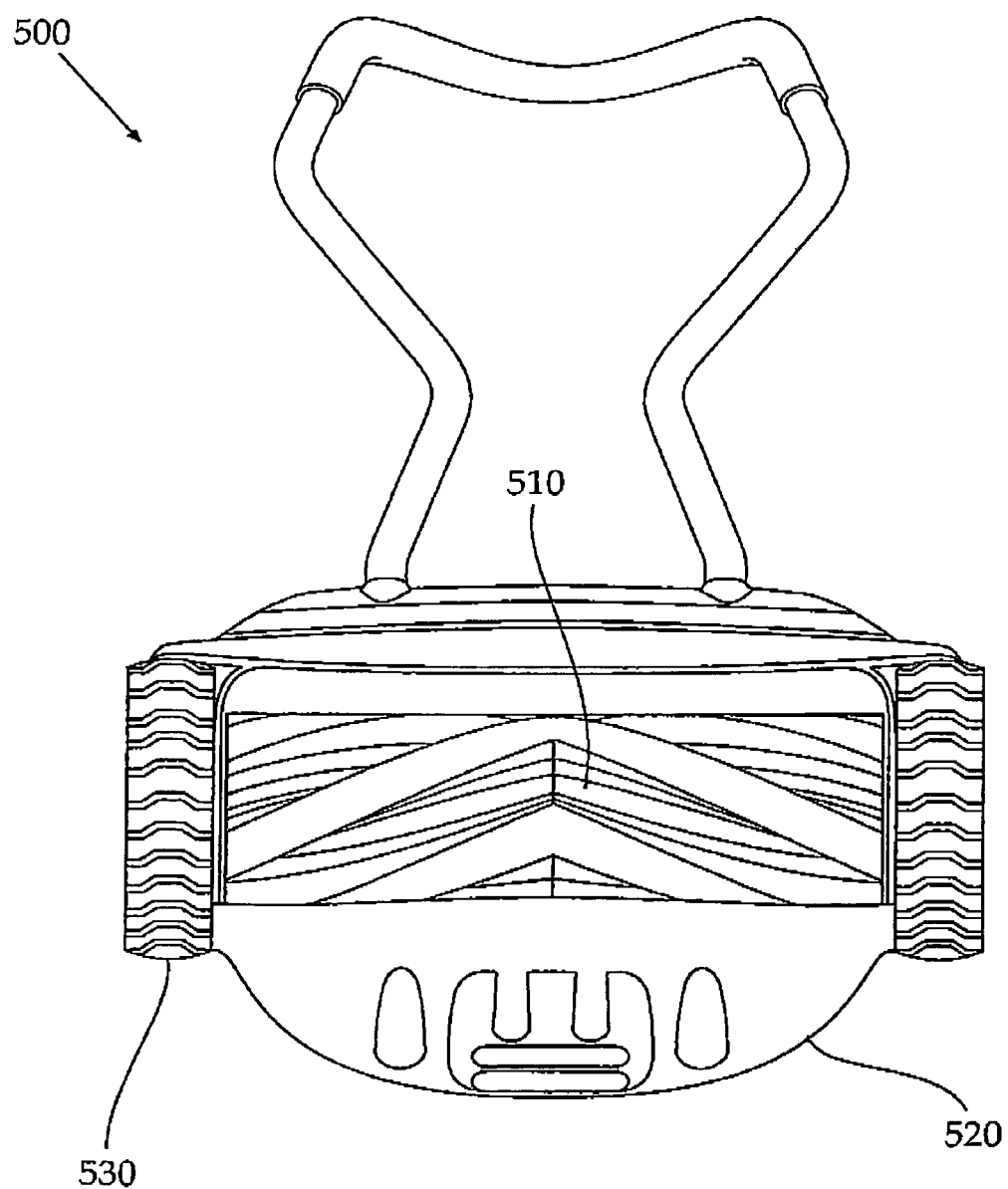
FIG. 5 illustrates the artificial turf cleaning system in bottom view, according to embodiments of the present invention.

FIG. 5 illustrates the artificial turf cleaning system in a bottom view, according to embodiments of the present invention. Artificial turf cleaning system 500 cleaning drum 510 and removable rubbish storage tank 520 are shown. Rotation of the artificial turf cleaning system wheels, when pushed forward on the artificial turf surface, back-rotates cleaning drum 510 which is connected mechanically by a transmission gear cog-wheels to wheels 530. The cleaning drum 510 has replaceable cleaning brushes installed inside (not shown) that are used to comb out dirt and rubbish accumulated in the artificial turf surfaces into removable rubbish storage tank 520.

Figure 1:
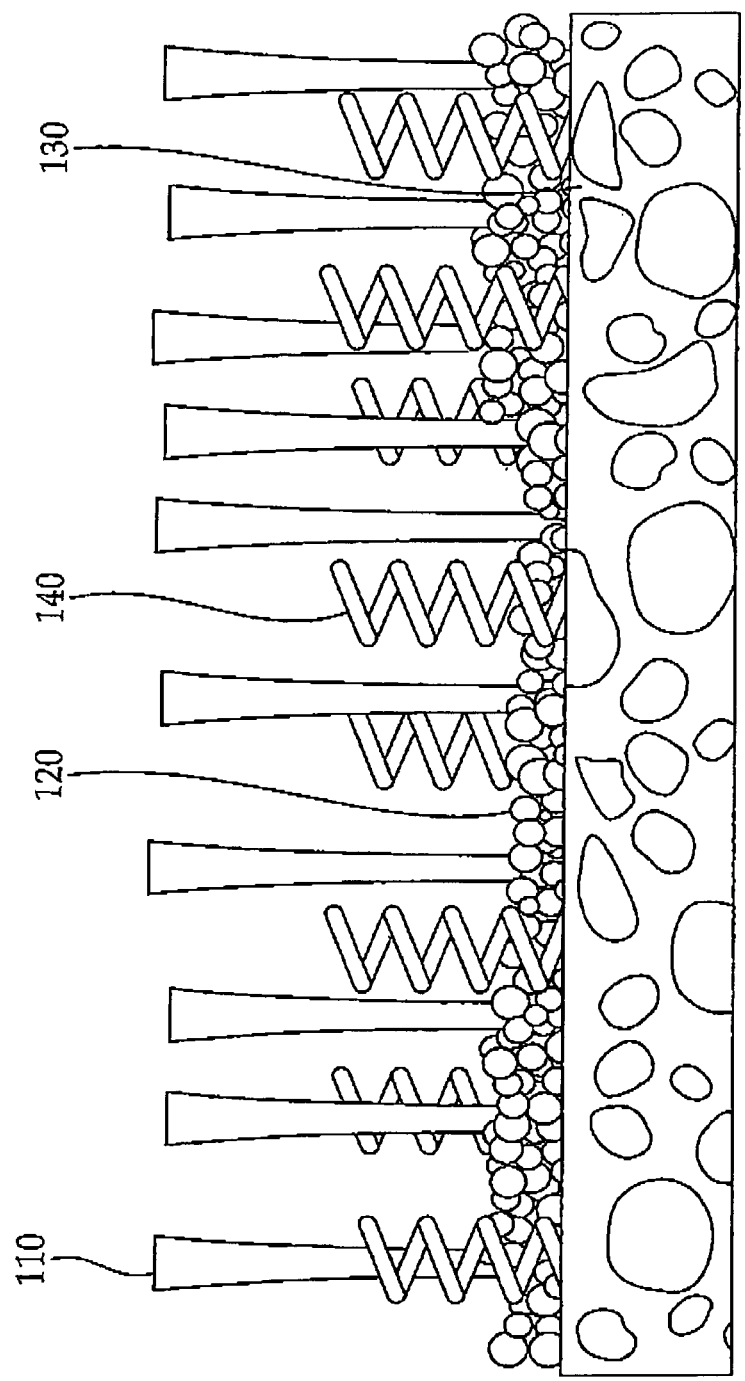
FIG. 1. illustrates typical artificial turf surface.

The replaceable cleaning brushes comb out dirt and rubbish accumulated in between the artificial turf fibers when the artificial turf cleaning system is pushed in opposite direction to the artificial turf fibers. Different brushes are provided with the artificial turf cleaning system 500. The provided brushes have different lengths, different widths, different stiffness and different density fibers. The brushes are also configured to clean and release the curly fibers shown in FIG. 1, 140 in order to straighten up the fibers 110 in an upright position.

According to embodiments of the present invention, the artificial turf cleaning system is comprised of light weight metal and plastic parts such that manually maneuvering the artificial turf cleaning system on the artificial turf surface is convenient.

Figure 6:
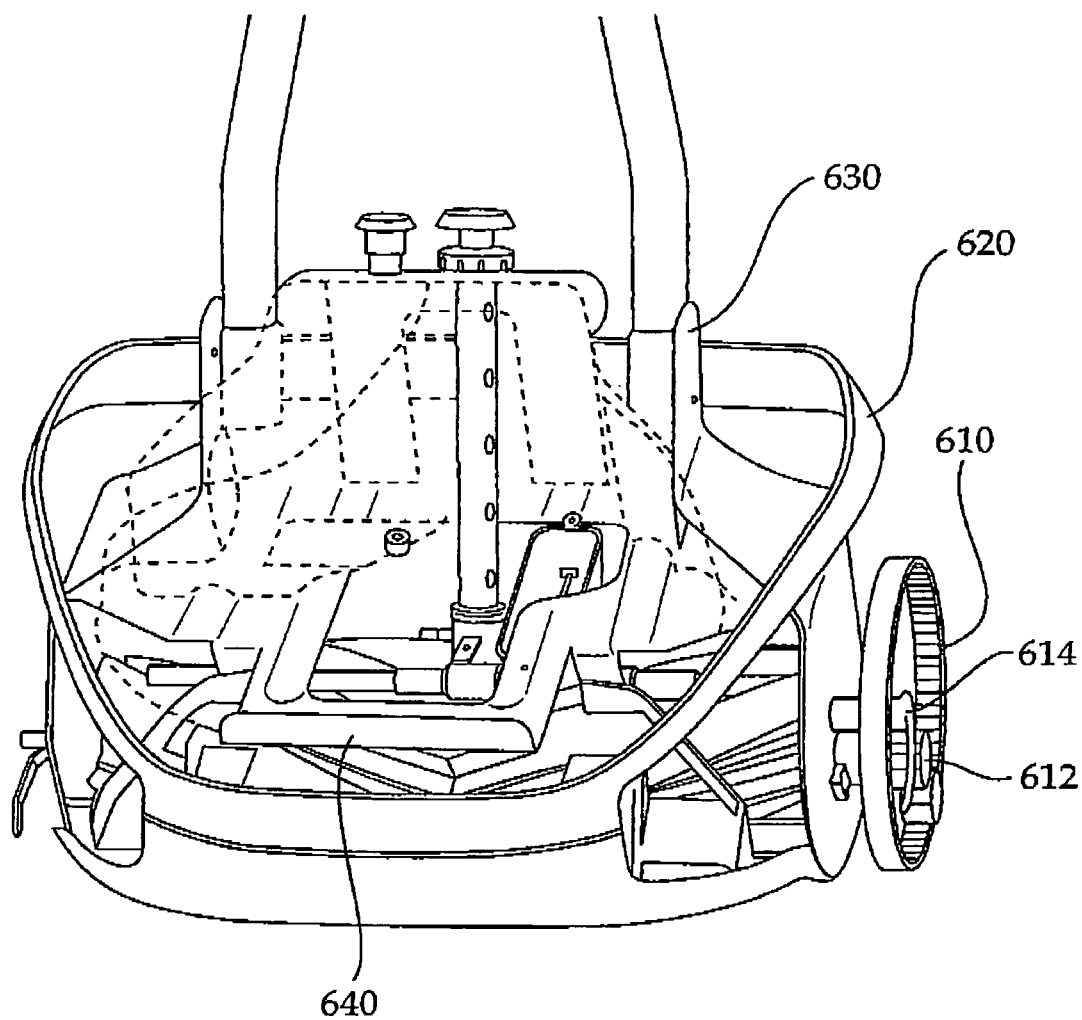
FIG. 6 illustrates the artificial turf cleaning system interior parts, according to embodiments of the present invention.

FIG. 6 illustrates the artificial turf cleaning system without the body top cover, according to embodiments of the present invention. Wheel 610 is connected to the cleaning drum axis 612 by transmission gear cog-wheels 614. Body hip chassis 620 is connected to the handle base 630 and is used for fixing the body top cover to the artificial turf cleaning system. Water and cleaning liquid tanks base 640 is used to fix the tanks firmly to their positions.

Transmission gear cog-wheels 614 disconnect from the cleaning drum axis 612 when the artificial turf cleaning system is pushed backwards. Transmission gear cog-wheels 614 re-connect to the cleaning drum axis 612 when the artificial turf cleaning system is pushed forward.

Figure 7:
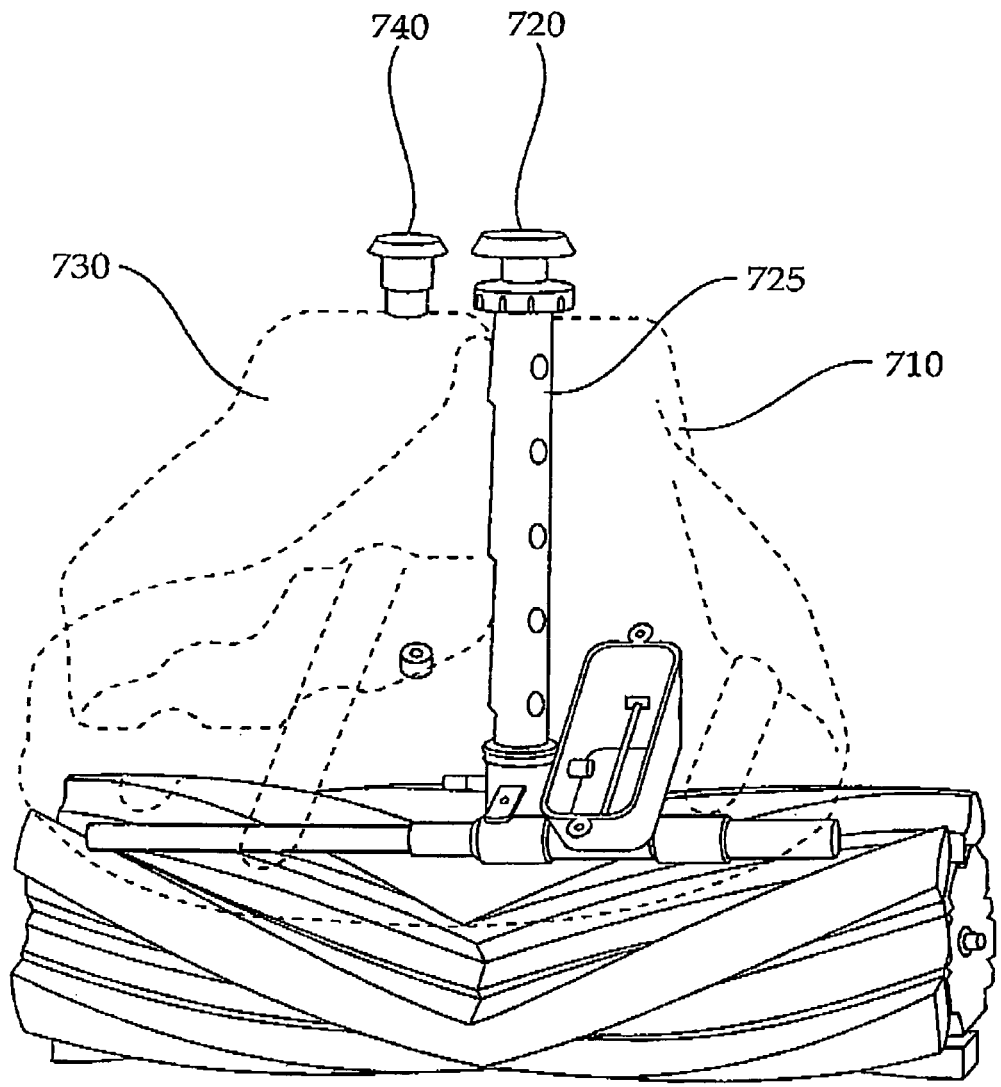
FIG. 7 illustrates the artificial turf cleaning system water and liquid tanks, the elongated rod and its tap, the mixing tank, the drip system and the cleaning drum, according to embodiments of the present invention.

FIG. 7 illustrates the artificial turf cleaning system water and liquid tanks, the elongated rod and its tap cover, according to embodiments of the present invention. Artificial turf cleaning system water tank 710 and cleaning liquid tank 730 are shown. Water tank 710 opening is covered with a tap 720 that is used as a cover to the water tank after it is filled with water and for rotating the elongated rod 725. Tap 720 has two protrusions in its bottom that protrude into two matching sockets in the elongated rod 725 when the tap is attached to the opening of the artificial turf cleaning liquid tank. The elongated rod is used to rotate an internal tap (shown in FIG. 9, 910) connected to its distal end, and used to control the dripping rate of the mixed cleaning liquid onto the artificial turf cleaning drum through a set of nozzles. Tap 720 has at least three dripping rate states in addition to a closed state that may be selected by rotating the tap.

Figure 8:
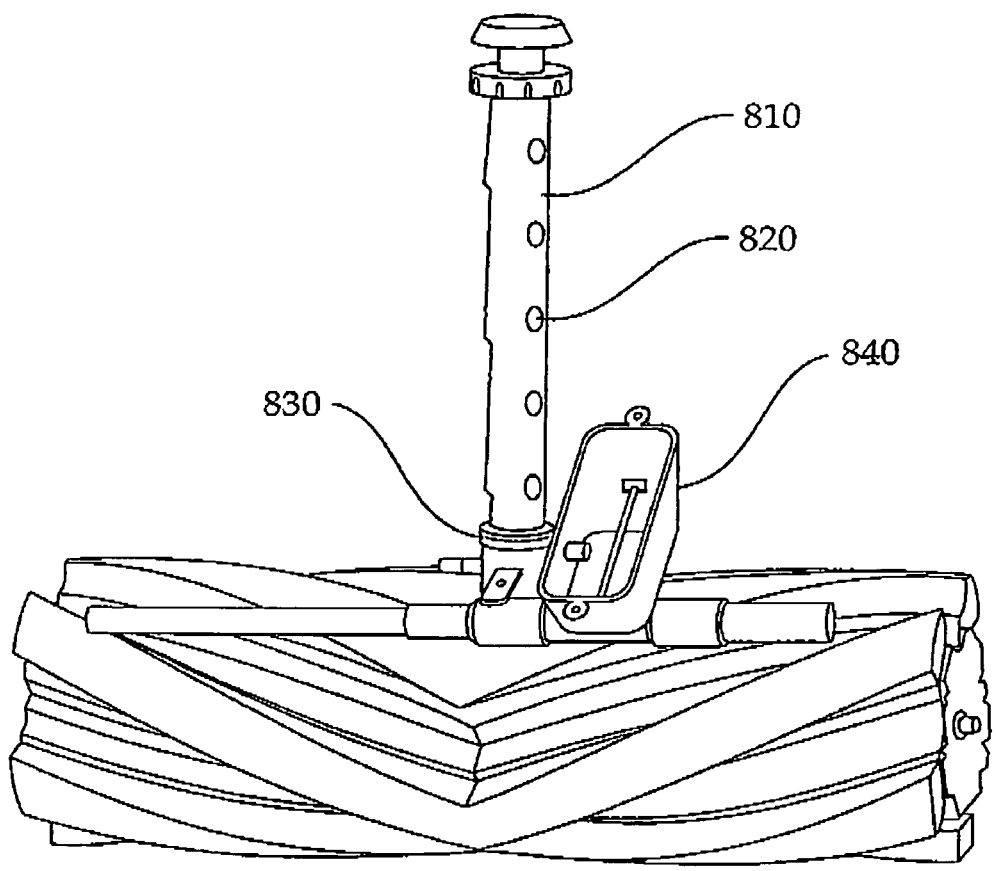
FIG. 8 illustrates the elongated rod, the nozzles in the elongated rod and the internal tap at the rod distal end, according to embodiments of the present invention.

FIG. 8 illustrates the elongated rod, the set of nozzles in the elongated rod and the internal tap at the rod distal end, according to embodiments of the present invention. Elongated rod 810 includes nozzles 820 that allow the liquid to leak through the elongated rod into the mixing tank 840. At the distal end of elongated rod 810 a sealing ring 830 is used to seal the joint between the elongated rod 810 and the internal tap shown in FIG. 9, 910. The artificial turf cleaning liquid ingredients are selected such that they do not harm or deteriorate sealing ring 830. Sealing ring 830 may be a rubber sealing ring. Other sealing ring materials may be used and are in the scope of the present invention. The internal tap controls the dripping rate of the mixed liquid accumulated in the mixing tank 840 through another set of nozzles (shown in FIG. 10, 1010) onto the cleaning drum brushes.

Figure 9:
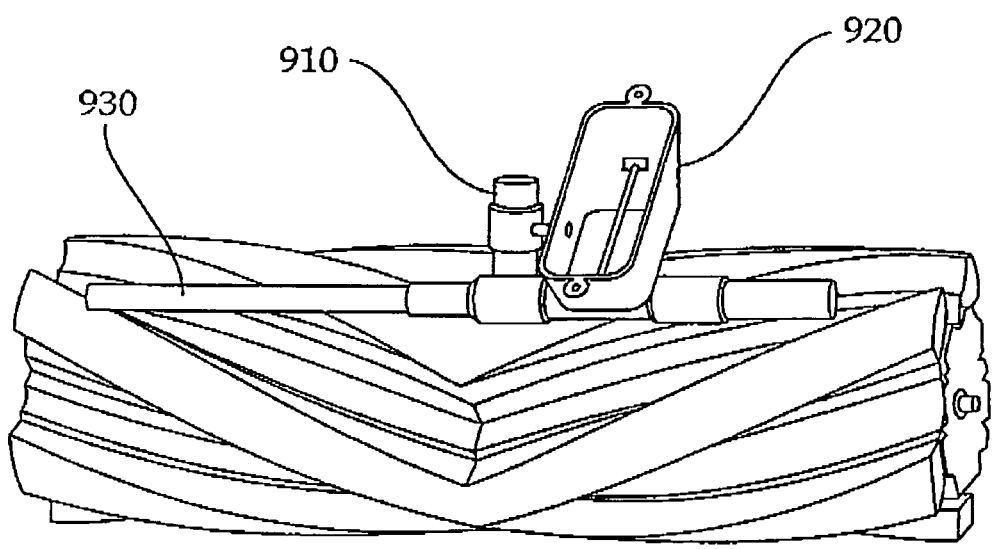
FIG. 9 illustrates the internal tap, the mixing tank, the drip system pipe and the cleaning drum, according to embodiments of the present invention.

FIG. 9 illustrates the internal tap, the mixing tank, the dripping system is pipe and the cleaning drum, according to embodiments of the present invention. Internal tap 910 controls the mixed solution accumulated in the mixing tank 920 dripping rate through the set of nozzles located at the bottom side of the dripping system pipe 930 (shown in FIG. 10, 1010).

Figure 10:
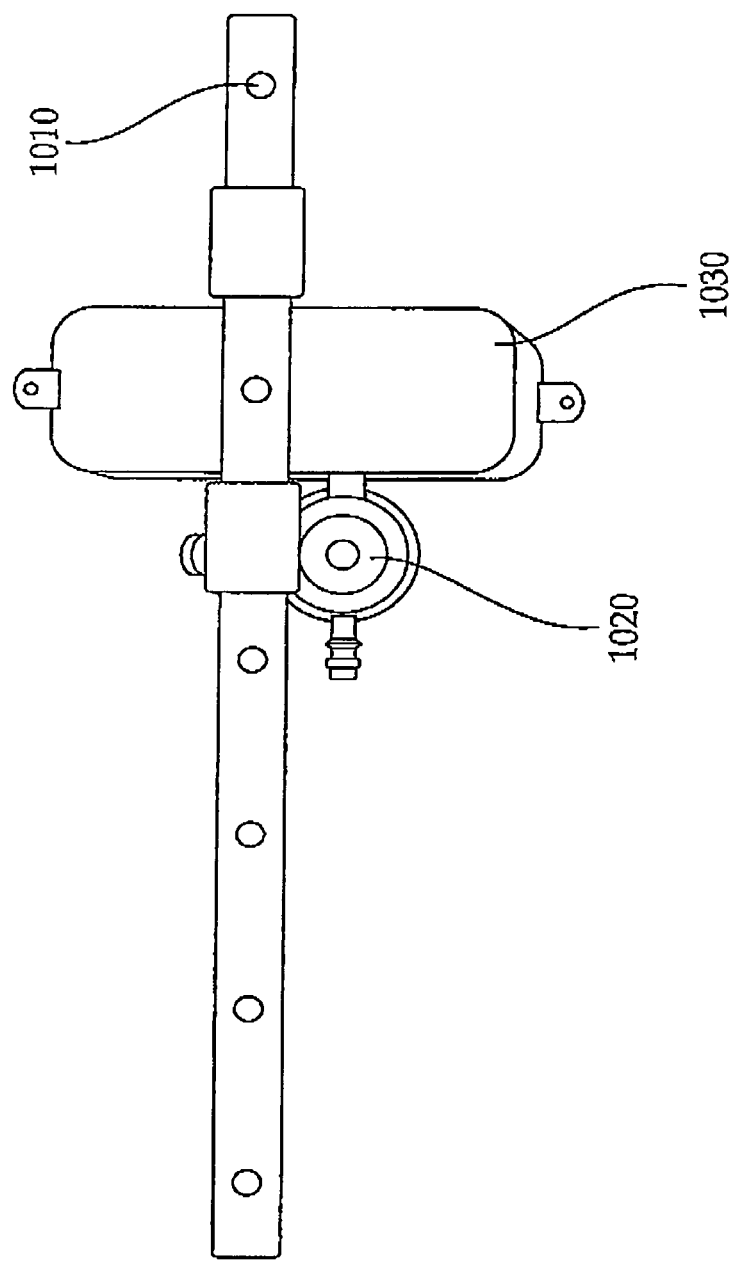
FIG. 10 illustrates the drip system pipe nozzles, the internal tap and the mixing tank in bottom view, according to embodiments of the present invention.

FIG. 10 illustrates the dripping system pipe nozzles, the internal tap and mixing tank in a bottom view, according to embodiments of the present invention. The dripping system pipe includes nozzles 1010 along the pipe on its bottom side that allow the mixed cleaning solution to drip onto the cleaning drum brushes. Internal tap 1020 and the mixing tank 1030 are also shown in FIG. 10 bottom view.

Figure 11:
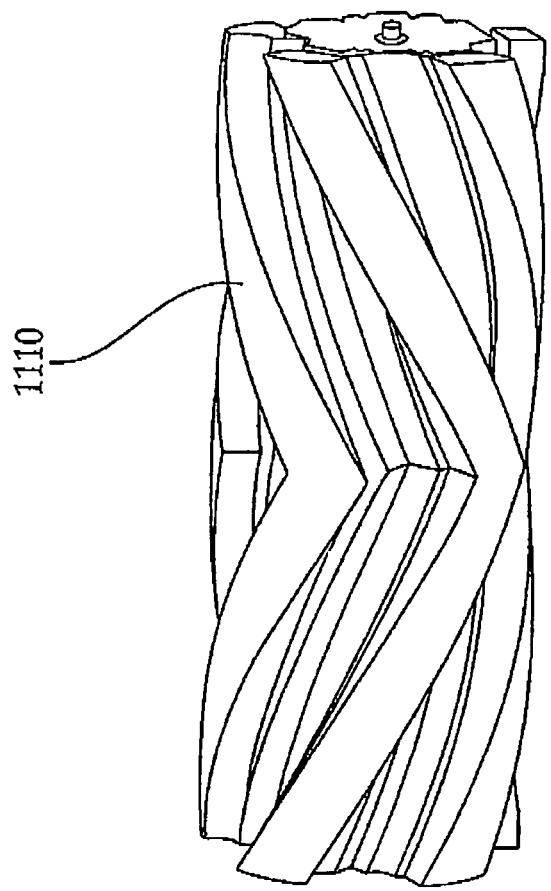
FIG. 11 illustrates the cleaning drum in front view, according to embodiments of the present invention.

FIG. 11 illustrates the cleaning drum in a front view, according to embodiments of the present invention. The cleaning drum 1110 rotates backwards relative to the wheels rotation and the replaceable brushes installed inside the cleaning drum remove dirt and rubbish from the artificial turf fibers. Brushing the artificial turf surfaces clean and renew the curly fibers and enable them to keep the straightened fibers in an upright position renewing the nice look of the artificial turf.

According to embodiments of the present invention, the cleaning drum may be further configured to vibrate in the direction of its axis, in the perpendicular direction to the moving direction, in order to brush effectively rubbish hidden in between the artificial turf fibers. The cleaning drum vibration may be achieved by providing a diagonal profile shape of one side of the cleaning drum such that when it is rolling around its axis it is pushed along its axis by a protrusion mounted on the inside wall of the artificial turf cleaning system, and wherein a spring located on the other side of the cleaning drum is tensed when the cleaning drum is pushed onto it and then it pushes back the cleaning drum when the wheels are rolling, creating the cleaning drum vibration.

According to embodiments of the present invention, the artificial turf cleaning system may include further a light source and an energy supply. The energy supply may be a mechanical dynamo used to transfer the wheels rotational energy to light. Alternatively, the energy supply may be a battery.

According to embodiments of the present invention, the artificial turf cleaning system may include further a power supply for rolling the wheels on the artificial turf forward and backwards and for rotating the cleaning drum.

Advantageously, the present invention artificial turf cleaning system is a cost effective system and is simple to operate and maintain.

Another advantage of the present invention artificial turf cleaning system described above is that its cleaning liquid is hazard free to the environment and to people.

Another advantage of the present invention artificial turf cleaning system described above is that the cleaning drum brushes are replaceable and are provided with various fiber lengths, widths, and densities that may be fitted to the type of artificial turf needed to be cleaned.

Another advantage of the present invention artificial turf cleaning system described above is that it is light weight and designed for cleaning artificial turf surfaces in residential lawns.

In summary, the artificial turf cleaning system of the present invention provides a simple and cost effective system for cleaning artificial turf surfaces in residential lawns.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and sub-combinations of the various features described hereinabove as well as variations and modifications thereof, which would occur to persons skilled in the art upon reading the foregoing description. While preferred embodiments of the present invention have been shown and described, it should be understood that various alternatives, substitutions, and equivalents can be used, and the present invention should only be limited by the claims and equivalents thereof

What is claimed is:

1. A method of cleaning an artificial turf surface with an artificial turf cleaning system comprising a water tank, a cleaning liquid tank, a mixing tank, a cleaning drum including a cleaning brush, and a transmission gear cog-wheel, the method comprising:
    rotating a removable cap covering an opening through which water is poured into the water tank, said rotating to mechanically manipulate an internal nozzle and an internal tap to allow water in the water tank and cleaning liquid in the cleaning liquid tank to mix in the mixing tank, and to adjust a drip rate at which the mixed liquid in the mixing tank drips unto the cleaning drum; and
    moving the cleaning system forward to allow the transmission gear cog-wheel to engage the cleaning drum and enable cleaning drum back-rotation.

2. A method according to claim 1 further comprising selecting the drip rate by rotating the cap to one of a plurality of predetermined drip rate positions.

3. A method according to claim 1 further comprising mixing the water and the cleaning liquid inside the mixing tank in a 1 to 4 ratio.

4. A method according to claim 1 further comprising accumulating dirt and rubbish in a rubbish storage tank.

5. A method according to claim 1 further comprising disengaging the transmission gear cog-wheel from the cleaning drum when the cleaning system is moved backwards to prevent cleaning drum rotation.

6. A method according to claim 1 further comprising manually maneuvering the cleaning system on the artificial turf.

7. A method according to claim 6 wherein said manually maneuvering comprises manually pushing the cleaning system forward.

8. A method according to claim 6 wherein said manually maneuvering comprises manually pulling the cleaning system backwards.

9. A method according to claim 1 further comprising vibrating the cleaning drum along its rolling axis in a direction perpendicular to the cleaning system's direction of movement.

* * * * *